(12) United States Patent
Taylor et al.

(10) Patent No.: US 8,284,166 B2
(45) Date of Patent: Oct. 9, 2012

(54) METHOD OF DETECTING AND TRACKING MULTIPLE OBJECTS ON A TOUCHPAD USING A DATA COLLECTION ALGORITHM THAT ONLY DETECTS AN OUTER EDGE OF THE OBJECTS AND THEN ASSUMES THAT THE OUTER EDGES DEFINE A SINGLE LARGE OBJECT

(75) Inventors: David Taylor, West Jordan, UT (US);
Paul Vincent, Fruit Heights, UT (US);
Jared C. Hill, Fruit Heights, UT (US);
Richard D. Woolley, Orem, UT (US)

(73) Assignee: Cirque Corporation, Salt Lake City, UT (US)

( * ) Notice: Subject to any disclaimer, the term of this patent is extended or adjusted under 35 U.S.C. 154(b) by 601 days.

(21) Appl. No.: 12/268,338

(22) Filed: Nov. 10, 2008

(65) Prior Publication Data
US 2010/0201631 A1   Aug. 12, 2010

Related U.S. Application Data

(60) Provisional application No. 60/986,867, filed on Nov. 9, 2007, provisional application No. 61/128,530, filed on May 22, 2008.

(51) Int. Cl.
*G06F 3/041* (2006.01)
*G06F 3/044* (2006.01)

(52) U.S. Cl. .......... 345/173; 178/18.01; 178/18.03; 178/18.06

(58) Field of Classification Search .......... 345/173
See application file for complete search history.

(56) References Cited

U.S. PATENT DOCUMENTS

| | | | |
|---|---|---|---|
| 7,812,828 B2 * | 10/2010 | Westerman et al. | 345/173 |
| 2005/0017959 A1 * | 1/2005 | Kraus et al. | 345/173 |
| 2006/0097991 A1 * | 5/2006 | Hotelling et al. | 345/173 |
| 2006/0187214 A1 | 8/2006 | Gillespie et al. | |
| 2007/0139395 A1 | 6/2007 | Westerman et al. | |

* cited by examiner

*Primary Examiner* — Sumati Lefkowitz
*Assistant Examiner* — Andrew Yeretsky
(74) *Attorney, Agent, or Firm* — Morris O'Bryant Compagni, P.C.

(57) ABSTRACT

A system and method for detecting and tracking multiple objects on a touchpad or touchscreen, wherein the method provides a new data collection algorithm, wherein the method reduces a calculation burden on a processor performing detection and tracking algorithms, wherein multiple objects are treated as elements of a single object and not as separate objects, wherein the location of the objects are treated as end-points of a single object when two objects are detected, and treated as a perimeter or boundary when more than two objects are detected.

6 Claims, 7 Drawing Sheets

METHOD OF DETECTING AND TRACKING MULTIPLE OBJECTS ON A TOUCHPAD USING A DATA COLLECTION ALGORITHM THAT ONLY DETECTS AN OUTER EDGE OF THE OBJECTS AND THEN ASSUMES THAT THE OUTER EDGES DEFINE A SINGLE LARGE OBJECT

CROSS REFERENCE TO RELATED APPLICATIONS

This document claims priority to and incorporates by reference all of the subject matter included in the provisional patent application, having Ser. No. 60/986,867 and filed on Nov. 9, 2007, and, having Ser. No. 61/128,530 and filed on May 22, 2008.

BACKGROUND OF THE INVENTION

1. Field of the Invention

This invention relates generally to methods of providing input to a touchpad. Specifically, the invention relates to a method of detecting and tracking multiple objects on a touch sensitive surface by treating the multiple objects as a single object whose perimeter or end-points are defined by the multiple objects, thereby treating the multiple objects as a single object in order to simplify detection and tracking algorithms.

2. Description of Related Art

As portable electronic appliances become more ubiquitous, the need to efficiently control them is becoming increasingly important. The wide array of portable electronic devices that can benefit from using a touch sensitive surface as a means of providing user input include, but should not be considered limited to, music players, DVD players, video file players, personal digital assistants (PDAs), digital cameras and camcorders, mobile telephones, laptop and notebook computers, global positioning satellite (GPS) devices and other portable electronic devices. Even stationary electronic appliances such as desktop computers can take advantage of an improved system and method of providing input to a touchpad that provides greater functionality to the user.

One of the main problems that many portable and stationary electronic appliances have is that their physical dimensions limit the number of ways in which communicating with the appliances is possible. There is typically a very limited amount of space that is available for an interface when portability is an important feature. For example, mobile telephones often referred to as smart phones are now providing the functions of a telephone and a personal digital assistant (PDA). Typically, PDAs require a significant amount of surface area for input and a display screen to be practical.

A recent entry to the mobile telephone market provides an LCD having touch sensitive screen capabilities. With a finite amount of space available for a display screen space because the smart phone is portable, a means was created for expanding and shrinking the relative size of the data being displayed. More specifically, consider a page of data that if displayed at a more conventional resolution would fill a page that is approximately the size of a normal sheet of paper. The entire page of data can be shown on the display screen but in a significantly reduced size because the physical dimensions of the display screen are small compared to the size of the typical sheet of paper. The problem was how to display the data on the page at a size that was usable. The solution was to magnify smaller portions of the page. Thus, only a portion of the whole page could be viewed at any one time. The effect was to zoom in or magnify portions of the page. The tradeoff is that the entire page cannot be viewed at the same time. Accordingly, the user must move or "drag" the data on the page so that different portions of the page are revealed.

Thus, consider an entire web page being displayed so that the entire screen is visible, but the physical size of the display screen is only a matter of inches on each side. The data on the page is typically illegible at such a small size. A user will select a portion of the page to be magnified. As the data on the page grows larger and larger, the outer edges of the page essentially disappear beyond the borders of the display screen. The user then drags a finger on the display screen, thereby changing what portion of the page is visible on the display screen. Accordingly, previously hidden portions of the page become visible as other portions become hidden.

One motion that can be performed on a touch sensitive surface such as touchscreen or touchpad to perform zooming in and out of a page is a pinching motion or its reverse. For example, to perform a zoom operation to magnify the page, a user brings a thumb and forefinger together until they are touching, then places the thumb and finger down on the touch sensitive surface so that a side of the thumb and finger make contact with the touch sensitive surface. The user then essentially spreads the thumb and forefinger apart from each other while maintaining contact with the touch sensitive surface. The magnification of the page on the display screen increases as long as the thumb and forefinger continue to move apart. Similarly, the magnification of the page on the display screen is reversed by simply pinching the thumb and forefinger together while maintaining contact with the touch sensitive surface. The user can make this pinching and reverse pinching and motion repeatedly, thereby causing the page to zoom in or out as the magnification increases or decreases.

Disadvantageously, one method that is well known in the prior for performing the detection and tracking of the thumb and forefinger on the touchpad surface is to detect and track the thumb and forefinger (or whichever digits are being used to pinch and reverse pinch) as separate objects on the touch sensitive surface. Tracking multiple objects means that the calculations that are performed for one object must be performed for each object. Thus, the calculation burden on any touchpad processor increases substantially for each finger or pointing object (hereinafter used interchangeably) that is being tracked.

It would be an improvement over the prior art to simplify the process of detecting and tracking multiple objects on a touch sensitive surface such as a touchpad or a touchscreen (referred to hereinafter as a touchpad). It would be an improvement over the prior art to simplify the process of detection and tracking of multiple objects on a touch sensitive surface such as a touchpad or a touchscreen.

It is useful to describe one embodiment of touchpad and touchscreen technology that can be used in the present invention. Specifically, the capacitance-sensitive touchpad and touchscreen technology of CIRQUE® Corporation can be used to implement the present invention. The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display screen, and thus as a touch screen.

In this touchpad technology of Cirque® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode.

All position measurements are made through the sense electrode. However, the row and column electrodes can also act as the sense electrode, so the important aspect is that at least one electrode is driving a signal, and another electrode is used for detection of a signal.

In more detail, FIG. 1 shows a capacitance sensitive touchpad 10 as taught by CIRQUE® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 (positive and negative) that are sent directly to the X and Y electrodes 12, 14 in various patterns. Accordingly, there is typically a one-to-one correspondence between the number of electrodes on the touchpad electrode grid, and the number of drive pins on the touchpad sensor control circuitry 20. However, this arrangement can be modified using multiplexing of electrodes.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE®Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be the X or Y electrodes by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

The prior art includes a description of a touchpad that is already capable of the detection and tracking of multiple objects on a touchpad. This prior art patent teaches and claims that the touchpad detects and tracks individual objects anywhere on the touchpad. The patent describes a system whereby objects appear as a "maxima" on a signal graphed as a curve that indicates the presence and location of pointing objects. Consequently, there is also a "minima" which is a low segment on the signal graph which indicates that no pointing object is being detected.

FIG. 2 is a graph illustrating the concept of a first maxima 30, a minima 32 and a second maxima 34 that is the result of the detection of two objects with a gap between them on a touchpad.

The prior art is always tracking the objects as separate and individual objects, and consequently must follow each object as it moves around the touchpad.

It would be an advantage over the prior art to provide a new detection and tracking method that does not require the system to determine how many objects are on the touchpad surface, and yet still be capable of being aware of their presence.

BRIEF SUMMARY OF THE INVENTION

In a preferred embodiment, the present invention is a system and method for detecting and tracking multiple objects on a touchpad or touchscreen, wherein the method provides a new data collection algorithm, wherein the method reduces a calculation burden on a processor performing detection and tracking algorithms, wherein multiple objects are treated as elements of a single object and not as separate objects, wherein the location of the objects are treated as end-points of a single object when two objects are detected, and treated as a perimeter or boundary when more than two objects are detected.

In a first aspect of the invention, existing touchpad and touchscreen (hereinafter referred to collectively as "touchpad") hardware and scanning routines can be used with this new analysis algorithm.

In a second aspect of the invention, the new analysis algorithm can be implemented in firmware without hardware changes.

In a third aspect, a touchpad performs a normal scanning procedure to obtain data from all the electrodes on the touchpad, wherein the data is analyzed by looking for an object by starting at an outer edge or boundary of touchpad and then moving inwards. Data analysis ends when the edge of an object is detected in the data. Analysis then begins on the outer edge or boundary opposite the first outer edge, and then continuing inwards. Again, data analysis ends when the edge of an object is detected in the data. The process is then repeated in the orthogonal dimension. Thus if the first boundaries are both horizontal boundaries of the touchpad, then analysis begins using both of the vertical boundaries. Analysis never shows what is detected on the touchpad past the edge of the first object from each direction. Thus, the touchpad never determines the total number of objects on the touchpad, and never has to calculate anything but the edge of objects from four directions, thereby substantially decreasing the calculation overhead on a touchpad processor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
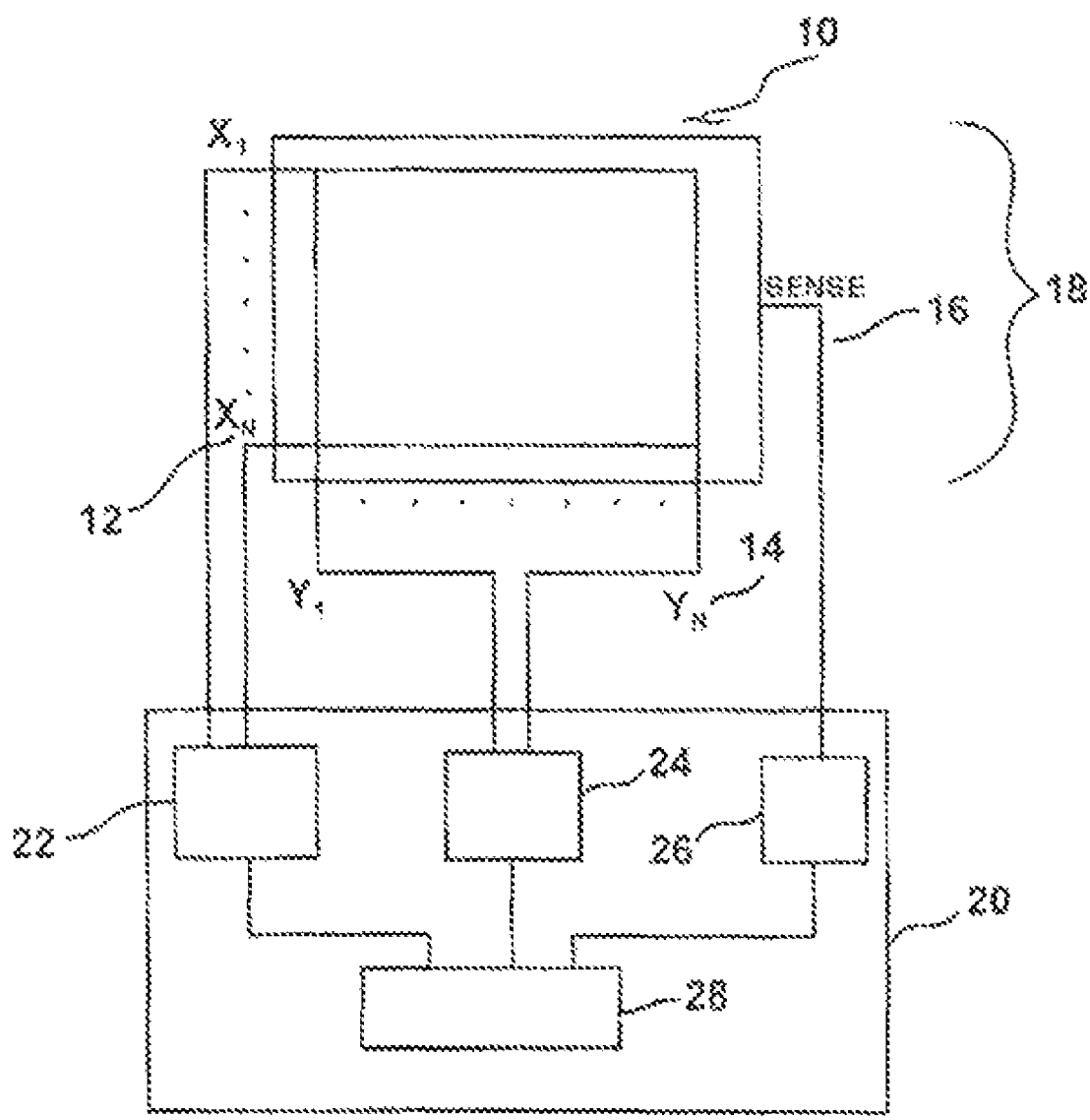
FIG. 1 is a block diagram of the components of a capacitance-sensitive touchpad as made by CIRQUE® Corporation and which can be operated in accordance with the principles of the present invention.
Figure 2:
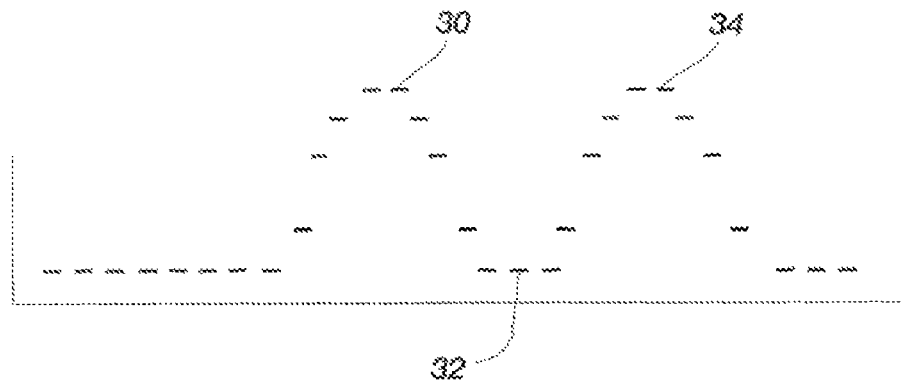
FIG. 2 is a graph showing the detection of two objects on a touchpad as taught by the prior art.

Before describing the embodiments of the present invention, it is important to understand that the touchpad hardware of the present invention scans all of the touchpad electrodes. The CIRQUE® touchpad has always had the ability to collect the same raw data as shown in FIG. 2 of the prior art. The manner in which the electrodes of the touchpad are scanned is an essential element of this patent. The CIRQUE® Corporation touchpad used in the present invention appears to be unique in that electrodes are scanned sequentially in groups and not simultaneously. Nevertheless, what is relevant to the invention is how the data is gathered from the electrodes of the touchpad. The importance of the new data collection algorithm will become apparent through the disclosure below.

Figure 3:
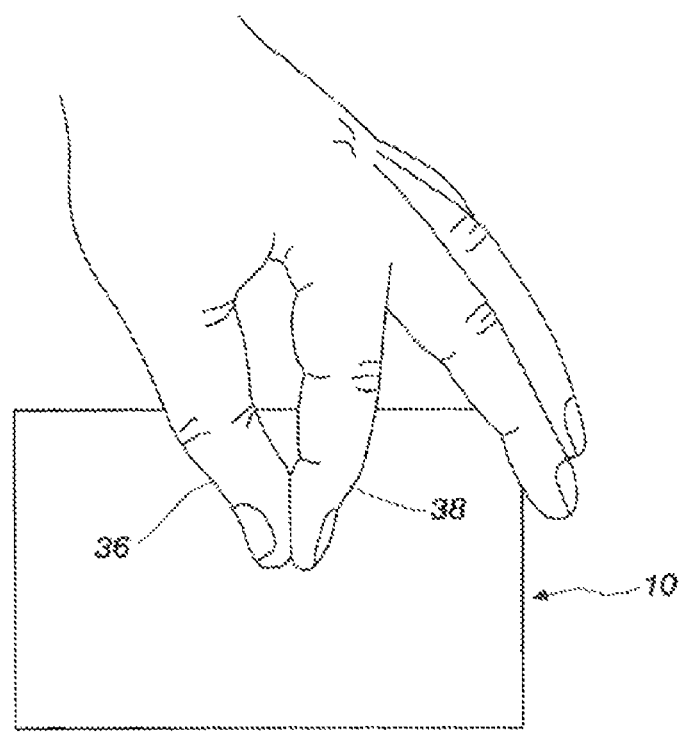
FIG. 3 is a top view of a touchpad of the present invention showing a user's hand with a thumb and forefinger touching the surface thereof.

FIG. 3 is provided as a top elevational view of a touchpad 10 that is made in accordance with the principles of the present invention. The touchpad 10 is capable of detecting and tracking multiple objects simultaneously. Consider a thumb 36 and forefinger 38 which are pressed together and placed at any location on the touchpad 10. It is likely that the thumb 36 and forefinger 38 combination will be seen as a single object by the touchpad 10. This is likely to occur because the tissue of the thumb 36 and forefinger 38 will likely be pressed hard enough to deform and essentially leave no gap between them when pressed against the touchpad 10. The normal detection algorithms will operate in the manner that they presently operate when a single object is detected. That is to say that a center point or centroid is determined for the object detected. This centroid is considered to be the position on the touchpad 10 of the object detected.

Figure 4:
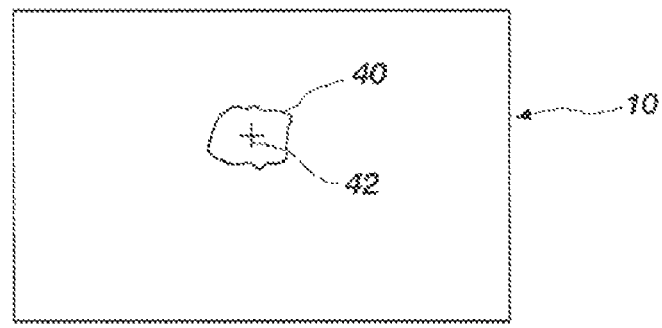
FIG. 4 is a top view of the touchpad showing that the touchpad sees a single object when the thumb and forefinger are touching.

FIG. 4 is a top elevational view of what the touchpad 10 might detect at the location of the thumb 36 and forefinger 38 on the touchpad 10. For example, the touchpad 10 might detect an irregular but roughly circular outline 40, with the location of a center point 42 indicated by the crosshairs. The object 40 is an approximation only, and should not be considered as a precise representation of what is detected by the touchpad 10. What is important to understand is that generally, only a single object will be detected.

As the thumb 36 and forefinger 38 are moved apart in the reverse pinching motion, the touchpad 10 could detect two separate objects. While touchpads have been capable of detecting multiple objects since their initial development, the detection and tracking of more than one object on a touchpad surface has always been assumed to be undesirable, and so algorithms were implemented so that one of the detected objects would be ignored while the location of the desired object would continue to be tracked. The decision as to which object to track could obviously be modified. However, it has been customary in the prior art to track the largest object while ignoring the smaller object. Nevertheless, this is an arbitrary decision, and some other means of selecting which object to track can be used, such as only tracking the first object to be detected.

The present invention is a new method of how to handle the detection and tracking of multiple objects. There are essentially two different scenarios. The first scenario occurs when only two objects are detected. The second scenario occurs when more than two objects are detected.

Figure 5:
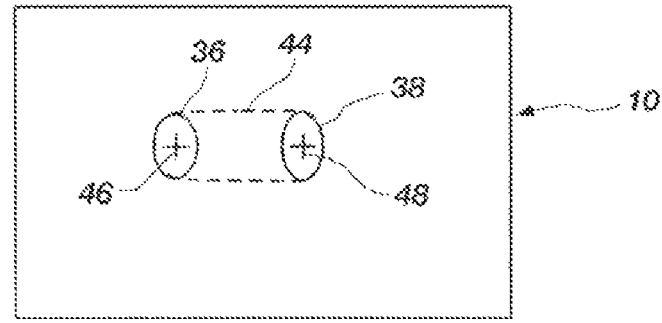
FIG. 5 is a top view of the touchpad showing that the touchpad sees two objects when the thumb and forefinger are separated, but are treated as a single object.

An illustration of an example of the first scenario is shown in FIG. 5. FIG. 5 is an illustration of what a touchpad 10 might detect when the thumb 36 and the forefinger 38 are laying sideways against the touchpad 10 when the thumb and forefinger are separated. FIG. 5 indicates that two objects 36, 38 are detected, each having its own centroid 46, 48 respectively and shown as crosshairs. Dotted line 44 is provided to illustrate how the method of the present invention uses the data from the two objects 36, 38. The dotted line 44 is used to indicate that the method of the present invention will treat the two objects 36, 38 as a single large object. This single object is elongated and thus appears to have two endpoints 46, 48.

If the thumb 36 and forefinger 38 are moved apart as shown in FIG. 5, then the method of the present invention treats the object as being a larger single object on the touchpad 10. Similarly, moving the thumb 36 and forefinger 38 closer together will result in the method seeing a smaller object on the touchpad 10, regardless of whether the thumb and forefinger are touching or not. It is emphasized that the algorithms that are needed to track a single object, be it large or small, are simpler than if the method has to track only a single object while intentionally ignoring a second object.

To state the first embodiment in a succinct manner, while the present invention recognizes that two objects are physically present on the touchpad 10, the data collection algorithms of the first embodiment will treat the two objects as if they are a single object.

It should be recognized that this scenario of detecting a single large object also occurs when the palm of a hand is placed on the touchpad 10. In fact, algorithms are typically developed to handle the situation when a large single object is detected. One typical scenario is to ignore the large object, assuming that a user has unintentionally rested the palm of a hand on the touchpad, and that no contact was intended.

Consider the heel of the palm of a hand being placed on the touchpad 10. The heel is relatively small and is a single object. Now if the palm is rocked forward so that more of the palm makes contact with the touchpad 10, the larger palm is still a single object, and it is seen by the touchpad 10 as a single object. Thus, the new data collection algorithm of the present invention functions the same when a single large object is detected and when two objects are detected. The first embodiment is programmed to look at the points of contact and to treat them as the outer edges of a single large object, whether they are formed from a single object such as the palm of a hand or formed by two or more objects such as the thumb 36 and forefinger 38. It should be apparent that the thumb 36 and forefinger 38 can be any two digits of a user's hand or even fingers from two different hands.

The first embodiment of the present invention operates essentially in the same manner when there are more than two objects detected on the touchpad 10. Instead of seeing endpoints, the present invention will see objects that indicate the perimeter or boundary of a single large object. Thus, the centroid of the single large object can be the "center" of the perimeter as determined by the algorithm.

Figure 6:
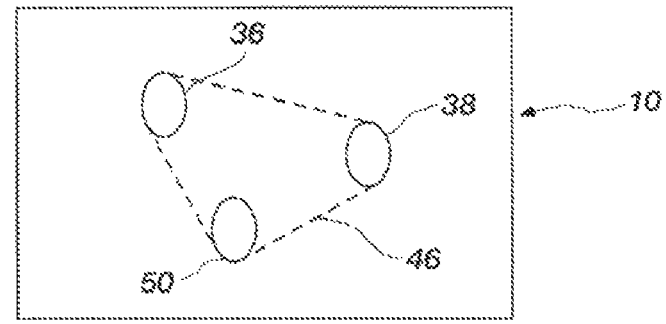
FIG. 6 is a top view of the touchpad showing that the touchpad sees multiple objects when three or more fingers make contact with the touchpad, but are still treated as a single object.

In FIG. 6, the scenario is now illustrated where more than two objects are making contact with the touchpad 10. In a second embodiment, the touchpad 10 is programmed to use the centroids of the multiple points of contact. The centroids are the outer edges of a single large object, whether they are formed from a single object such as the palm of a hand or formed from multiple objects such as the thumb 36, the forefinger 38 and at least one other finger. It should be apparent that the thumb 36 and forefinger 38 can also be replaced by any other digits of a user's hand or even digits of different hands.

Thus in FIG. 6 three objects 36, 38 and 50 are now detected. Dotted line 46 is used to show that the size of the object is determined by using the detected objects as the perimeter of the single object.

Having determined that the touchpad 10 can now treat multiple objects as a single object, this information can now be used by the present invention to perform the operation described previously for zooming in and out of data on a page that is being shown on a display screen.

In the scenario when two objects are detected, the single object is determined to be growing larger if the thumb 36 and forefinger 38 are performing the reverse pinching action. If the object is determined to be growing larger, then the image on the display screen is magnified when the zooming in function is being performed. Similarly, the single object is determined to be shrinking in size when the thumb 36 and the forefinger 38 are performing the pinching action. In response to the object shrinking in size, the image on the display screen is reduced in magnification, and thus the user is zooming out of the page.

The invention operates the same when two or more objects are detected on the touchpad 10. If the object is determined to be growing in size, then magnification is increased and the display screen zooms in on the data being displayed. If the object is determined to be shrinking in size, then magnification is decreased and the display screen zooms out to show more of the data. Other examples will follow that illustrate the uses of the new data collection algorithm.

Figure 7:
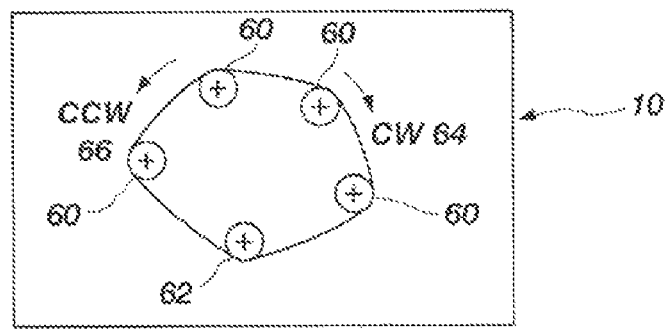
FIG. 7 is a top view of the touchpad showing that multiple objects may be tracked as a single large object as the multiple objects are rotated.

Another aspect of the present invention is the ability to detect the rotation of a large object on the touchpad 10. Consider FIG. 7 wherein multiple objects are in contact with the touchpad 10. In this example, five objects are touching the touchpad. These five objects could be, for example, the tip of four fingers 60 and a thumb 62. More or less objects could also be used. What is important is that the five objects are now rotated. This roughly circular motion can be interpreted to be some type of command. For example, rotation in a clockwise direction 64 could be interpreted as scrolling down in a list, and rotation in a counter-clockwise direction 66 could be interpreted as scrolling up in a list. The actual function being performed is not important. What is important is that the embodiments of the present invention enable determination of the direction of rotation so that a function can be performed.

In all of the embodiments of the present invention described, it has been stated that a new data collection algorithm is used to find the edges of a boundary as defined by the multiple objects on a touchpad 10. Thus, when a first object is detected on the touchpad 10, the existing detection and tracking method operates as usual. But when an object appears to change in size or shape, or a second or more objects are detected, a new data collection algorithm is implemented.

Figure 8:
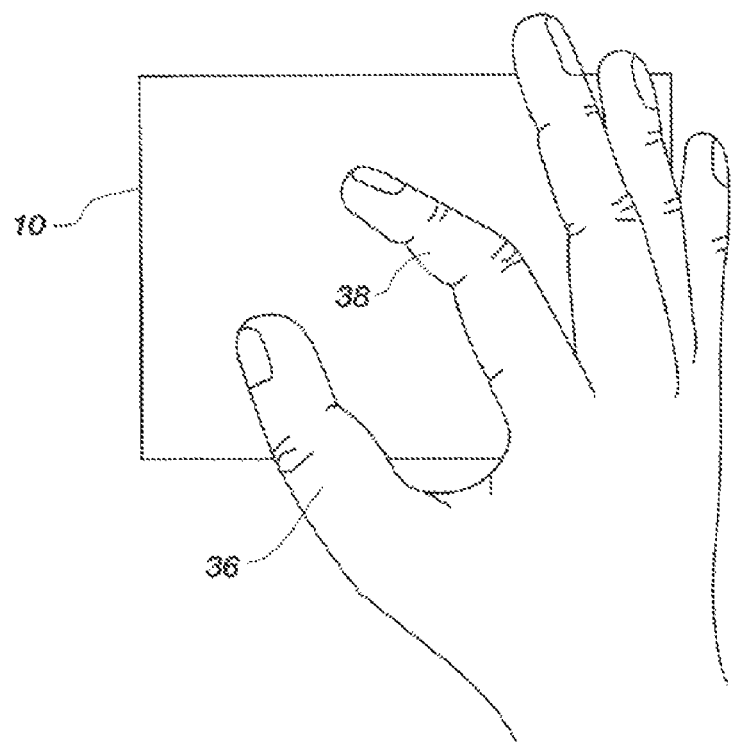
FIG. 8 is a top view of a touchpad of the present invention showing a user's hand with a thumb and forefinger spread apart and touching the surface thereof.

In FIG. 8, two objects are placed on the touchpad 10. These two objects are a thumb 36 and a forefinger 38 of a user's right hand. Touchdown of the objects 36, 38 on the touchpad 10 may not be simultaneous, and so a single-object detection and tracking algorithm was most likely performed or was starting to be performed by the touchpad. In the single-object detection algorithm, wide and narrow scanning algorithms are used to identify a quadrant and a location within the quadrant where the object is located.

Once the quadrant is identified, a narrow scanning algorithm is executed, but only within the quadrant that the object was detected. However, when the second object is detected, then the single-object algorithm is made secondary in favor of the new analysis algorithm of the present invention.

In the new data collection algorithm of the present invention, analysis is performed on a touchpad 10 that is assumed to have four sides that form a rectangle. It should be apparent that the present invention is not limited to this configuration and the invention should not be considered to be limited as such. What is important is that the data collection algorithm begins at the outer edges, regardless of the number, and proceeds across the touchpad.

For illustration purposes only, it is assumed that the touchpad 10 has four sides. The data generated will be a scan of the X electrode array and the Y electrode array in a typical rectangular touchpad 10.

The analysis can begin on data from either electrode array and from any edge or boundary of the electrode array. For a four sided touchpad 10, the analysis is therefore performed a total of four times in order to analyze each electrode array from both of its outer edges and proceeding across the touchpad toward an opposite edge until an object is detected.

Figure 9A:
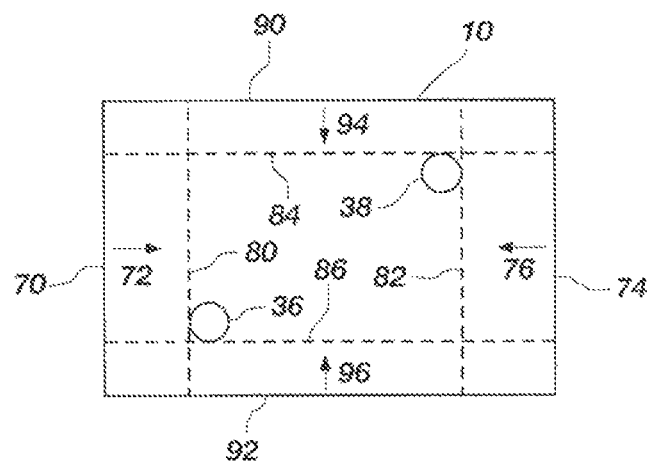
FIG. 9A is a top view of a touchpad of the present invention that illustrates the new and simplified data collection algorithm that is operated in accordance with the principles of the present invention.

In FIG. 9A, we consider a data set taken from X and Y electrode arrays. The analysis from data collected from a first edge 70 (arbitrarily selected) of the X electrode array proceeds inwards or across the array as indicated by arrow 72 until an object 36 is detected at dotted line 80. The portion of the object detected will typically only be an edge of the object. Then the analysis is repeated on the data collected for the X electrode array but from the edge opposite the first edge, which is edge 74. Moving in the direction of arrow 76 the analysis stops as soon as the edge of an object 38 is detected at dotted line 82. The object detected could be the same object if the two objects 36, 38 are in a vertical line, but in this example there is a second object 38. Collection of data from the X electrode array is complete.

Analysis then begins on a data set taken from the Y electrode array. Like the X electrode array, the analysis is performed from two outer edges 90, 92 moving in the direction of arrows 94 and 96 respectively until the edge of an object is detected. Thus, one complete analysis of the scanning data requires four separate scanning operations. This analysis is performed repeatedly as long as more than one object is detected by the touchpad 10.

Most touchpads are configured as either a quadrilateral or a circle. When configured as a quadrilateral, the new data collection algorithm evaluates scanning data from all four edges and proceeding inwards across the touchpad. The touchpad hardware of the present invention is only capable of performing the new data collection algorithm from only one edge at a time. However, the present invention also includes the concept of performing the new data collection algorithm from the four outer edges simultaneously.

If the touchpad is configured as a circle or some other ellipsoid, then the new data collection algorithm can only be used if the touchpad is created using a quadrilateral XY electrode grid that has been cut in the shape of a circle, or has a circular overlay superimposed upon it, even though the physical XY electrode grid is a quadrilateral. What should be understood is that the new data collection algorithm can be adapted to the shape of any touchpad.

In alternative embodiments, the new data collection algorithm can be utilized with more advanced shapes, such as true circles, rings, etc. The analysis should always be performed from an outer edge towards an opposite or inner area of the touchpad.

FIG. 9A illustrates the results of the new data collection algorithm of the present invention by examining a top view of the touchpad 10. A circle is used to indicate the location on the touchpad 10 where the thumb 36 is making contact. A circle hereinafter is equivalent to the location of a pointing object making contact with the touchpad 10. Similarly, a different circle is used to indicate the location on the touchpad 10 where the finger 38 is making contact.

The touchpad groups electrodes together to perform the new data collection algorithm. Gathering data from the left edge 70 of the touchpad 10, collecting stops when circle 36 is reached, as indicated by dotted line 80. Collecting data from the right edge 74 of the touchpad 10, the step of collecting data stops when circle 38 is reached, as indicated by dotted line 82. Similarly, collecting data from the top edge 90 of the touchpad 10, collecting data stops when circle 38 is reached, as indicated by dotted line 84. Finally, collecting data from the bottom edge 92 of the touchpad 10, data collection stops when circle 36 is reached, as indicated by dotted line 86. The data collection sequence above is for illustration purposes only and should not be considered as limiting. Thus, data can be collected beginning from any edge.

The other important aspect of the invention is that data collection stops as soon as the edge of any object is detected. Stopping data collection can result in a significant increase in speed of the data collection algorithms because only outer boundaries are determined. If one or both of the objects are near the outer edges of the touchpad 10, then the data collection will occur relatively rapidly as data collection stops at the edge of each object.

Figure 9B:
FIG. 9B is a graph that shows the results of the new data collection algorithm of the present invention.

FIG. 9B is a graph of the raw scanning data that is collected by the touchpad 10 of the present invention that is comparable to the graph of FIG. 2 of the prior art. From the outer edges of a touchpad 10, the touchpad collects data until detecting an object. Notice that no data is obtained for any object that is between the outer edges 66, 68 of the detected objects 36, 38. To the new data collection algorithm, the detected objects appear as one large object because no information is obtained once an outer edge of the objects 36, 38 are detected. The algorithm might choose to simply fill in the data in the gap between the outer edges 66 and 68, but it is not necessary.

Figure 10:
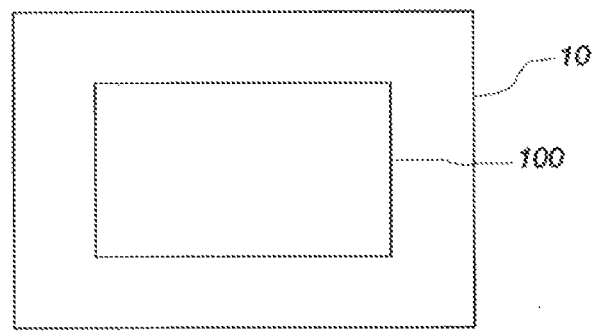
FIG. 10 is a top view of the touchpad that illustrates the outline of a quadrilateral that represents the outer boundaries of two pointing objects.

FIG. 10 is a top view of the touchpad 10. A box 100 indicates the shape of the object that has been detected using the new data collection algorithm of the present invention. In this embodiment, the resulting shape generated by the new data collection algorithm will appear as a quadrilateral whose opposing sides are parallel. Thus, the shape will always be rectangular, with the only difference being the dimensions of the sides.

Figure 11:
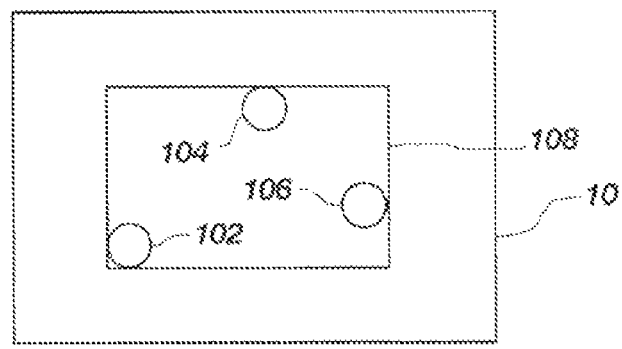
FIG. 11 is a top view of a touchpad that shows how the three pointing objects can be seen by the new analysis algorithm when each pointing object is nearer than any other to at least one edge of the touchpad.

In an alternative embodiment shown in FIG. 11, consider the three objects 102, 104 and 106 shown on touchpad 10. The collection algorithm of the present invention creates the boundary as shown by the outline 108. The outline 108 was created by three objects 102, 104 and 106, and the same shape box was created using only two objects 36 and 38 in FIG. 9A.

There are some observations about the new data collection algorithm of the present invention that are not immediately apparent, but are important.

Figure 12:
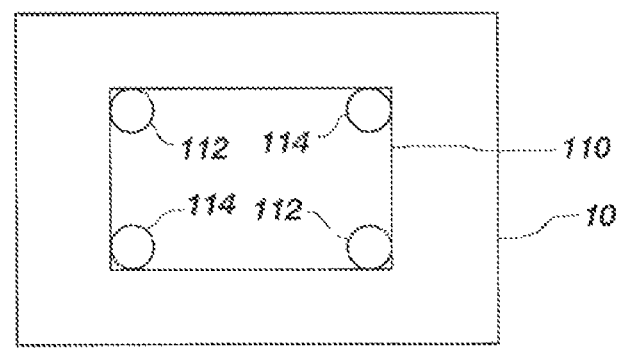
FIG. 12 is a top view of a touchpad that shows that it is not possible to know which corners of the quadrilateral the detected objects are actually located.

FIG. 12 is a top view of the touchpad 10 that shows a quadrilateral 110. There are four circles in the corners of the quadrilateral. The circles represent two different pairs of objects that can both create the quadrilateral 110. Thus, circles 112 represent one pair of objects, and circles 114 represent a second pair of objects. The present invention does not generate data which would let a user of the touchpad know which pair of objects is present on the touchpad 10. The touchpad processor that performs the analysis for the touchpad cannot determine which objects are present using the new data collection algorithm of the present invention.

In an alternative embodiment, the present invention performs an analysis that can detect in which corners of the quadrilateral the objects are actually disposed.

Advantageously, it is not necessary to know which pair of objects is present in order to use this information in a useful manner. For example, if the overall size of the quadrilateral 110 is shrinking, then one or both of the pointing objects on the touchpad 10 are moving towards each other. For example, both pointing objects can move in a pinching action, or one pointing object can remain stationary while the other pointing object moves towards it.

Figure 13:
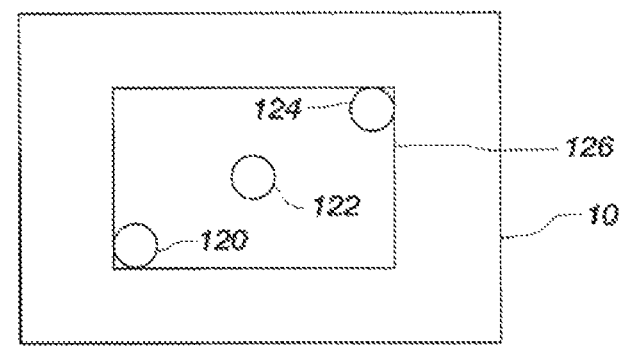
FIG. 13 is a top view of a touchpad that illustrates the fact that the new analysis algorithm does not determine how many pointing objects are within the boundaries of the outer pointing objects.

Another observation of the present invention is that more than two objects may or may not be visible using the detection and tracking algorithm of the present invention. For example, FIG. 13 is a top view of a touchpad 10 with circles 120, 122 and 124. The middle pointing object 122 is not visible to the new data collection algorithm because analysis to detect pointing objects stops when the pointing objects indicated by circles 120 and 124 are reached. Thus, circle 122 is entirely within the borders of the quadrilateral 126, and is never seen by the data collection algorithm.

In contrast, FIG. 11 shows different placements of three pointing objects 102, 104 and 106. Arranged in this manner, all three circles are visible to the new data collection algorithm. Quadrilateral 108 shows that the data collection algorithm will reach each of the three circles 102, 104 and 106. Therefore, the new data collection algorithm of the present invention can detect all three circles as long as each of the circles is closer to at least one edge of the touchpad 10 than any of the other circles.

Figure 14:
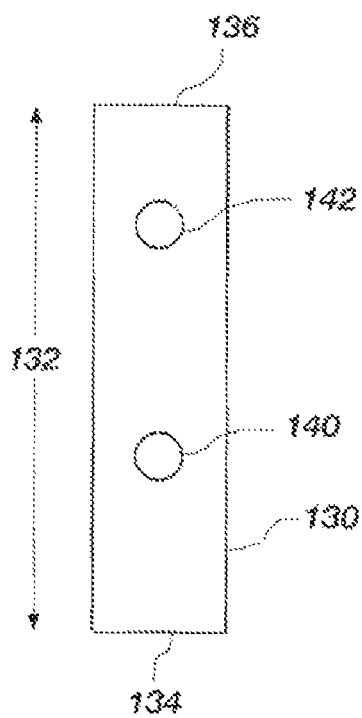
FIG. 14 is a top view of a one-dimensional touchstrip that can also be used with the new analysis algorithm of the present invention.

FIG. 14 is provided as an alternative embodiment of the present invention. A special case of the present invention can be applied to a touchpad that operates in a single dimension. Such a touchpad is sometimes referred to as a touchstrip. A touchstrip operates in a single axis which is typically but not necessarily the longest axis of the touchstrip. FIG. 14 shows a touchstrip 130 which detects touchdown and movement along a lengthwise axis 132.

The new analysis algorithm of the present invention operates in a manner that is similar to the manner in which it operates on a general purpose touchpad described previously. However, instead of performing the new analysis algorithm from four outer edges, the touchstrip 70 only performs a scanning procedure from the outer edges 134, 136 that are the endpoints of the axis of operation 132.

The touchstrip 130 can still perform detection and tracking of a single pointing object. When the touchstrip detects multiple objects, the new analysis algorithm begins to scan from each of the outer edges 134, 136. Scanning stops when a first pointing object 140 is detected when scanning from the outer edge 134 and when a second pointing object 142 is detected when scanning from the outer edge 136. The new analysis algorithm will not detect touchdown of any additional pointing objects between the first and second pointing objects 140, 142 because there is no tracking in a second dimension, and data collection always stops when the first pointing object is detected when moving in from either outer edge.

The touchstrip 130 is often used in applications that only require tracking of movement in a single dimension. For example, the touchstrip 130 can be used for scrolling, increasing the value of a variable, decreasing the value of a variable, etc.

Another observation is that the prior art touchpads that can detect multiple pointing objects on a touchpad always see each pointing object on the touchpad, regardless of its position with respect to other objects on the touchpad. For example, all three circles 120, 122 and 124 shown in FIG. 13 are detectable in the prior art, but not in the present invention.

Another observation is that there are some unique gestures that can be performed on the touchpad 10 using the new data collection algorithm. The gestures are unique in that they do not require the tracking of multiple individual pointing objects on the touchpad in order to recognize the gesture.

In one set of gestures, consider a first pointing object making touchdown and not moving. A second pointing object makes touchdown and then performs actions that are observable by the new data collection algorithm and which result in certain actions being performed.

For example, the first pointing object makes touchdown in a first zone. The first zone is defined as a specific region on the touchpad that indicates that a second pointing object will indicate the function to be performed. The second pointing object can tap the touchpad, tap in a specific location, double tap, double tap in a specific location, flick towards a particular direction, make touchdown and then drag, make touchdown and then drag towards or make contact with a specific edge of the touchpad, make touchdown without any movement, or make touchdown without any movement but in a specific location. This list should not be considered as limited to the specific examples above.

Another gesture that can be performed is referred to as a stake and action gesture. Thus, instead of using a specific zone, the first pointing object makes touchdown anywhere that is convenient on the touchpad, and then the second pointing object performs an action that defines what function is to be performed. The actions of the second pointing object include all the actions described above that can be combined with the first zone.

Figure 15:
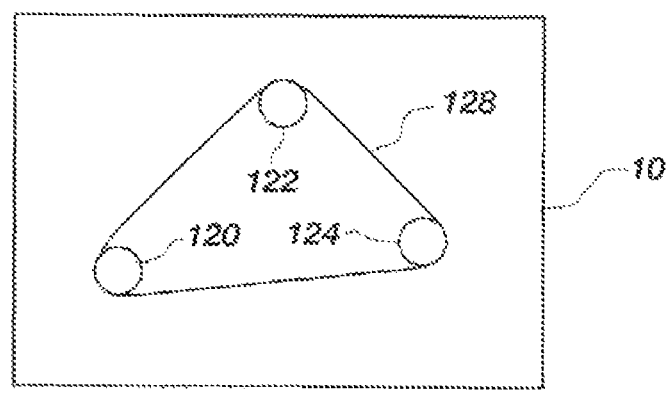
FIG. 15 is an alternate embodiment of the present invention, wherein the quadrilateral boundary is replaced by a form-fitting boundary that moves from object to object.

FIG. 15 is provided to illustrate another alternative embodiment of the present invention. In the previous embodiments, the outline around the perimeter of the objects has always been in the shape of a quadrilateral. In this embodiment, the outline is made to conform to each of the objects detected. Thus in this example, FIG. 15 shows that there are three objects 120, 122 and 14 which form a triangular object as shown by outline 128. This embodiment may require a modification of the data collection algorithm.

One aspect of the invention is related to determining the size of the quadrilateral that is formed by the detected objects. More specifically, it relates to whether or not the size is increasing or decreasing. The operation of functions can be made a function of the size of the quadrilateral. For example, if the quadrilateral is shrinking, then the user might be doing a pinching action with a thumb and forefinger. In contrast, if the quadrilateral is growing, then the user might be doing a reverse pinching action. The increasing or decreasing size of the quadrilateral can be tied to a function. Thus, the pinching action might control zooming in, and the reverse pinching action might control zooming out. Magnification or zooming is only one of many functions that can be tied to the changing size of the quadrilateral, and should not be considered limiting.

A final aspect of the present invention is the ability to select a region on a touchpad that is dedicated to the new data collection algorithm of the present invention. Thus, the new data collection algorithm does not have to use the entire active sensing area of a touchpad or touchstrip. A smaller portion or region can be devoted to the new data collection algorithm.

The present invention has taught a new data collection algorithm which begins at an outside edge and moves inwards or across a touchpad. Alternatively, the data collection algorithm could begin at a center and move outwards towards the outer edges of the touchpad.

The present invention has also focused on the detection and tracking of objects on a rectangular touchpad. In a circular touchpad, the circular detection area could just be an overlay over a rectangular grid. However, a circular electrode grid might also be used. In a first circular embodiment, the data collection algorithm stops when it reaches a first object as the algorithm moves from the single outer edge towards the center of the touchpad, or from the center outward in all directions toward the outer edge.

However, in a second circular embodiment, the circular electrode grid might be segmented into quadrants like pieces of a pie. Thus, the data collection algorithm would detect one object in each of the separate quadrants.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for detecting a plurality of objects on a touch sensitive surface, said method comprising the steps of:
    1) providing a plurality of electrodes that form a sensor grid for detecting a presence of at least two objects on the touch sensitive surface, said plurality of electrodes forming a quadrilateral having four edges;
    2) detecting a presence of at least two objects on the touch sensitive surface by performing the following data collection algorithm from each of the four edges;
    3) collecting data from the plurality of electrodes beginning from an edge and moving towards an opposite edge;
    4) stopping data collection when an object is detected; and
    5) repeating steps 3 and 4 by starting data collection beginning at each of the four edges in order to determine the boundaries of a perimeter formed by the at least two objects, and wherein each of the at least two objects lies within the perimeter.

2. The method as defined in claim 1 wherein the step of providing a plurality of electrodes that form a sensor grid further comprises the step of providing a plurality of X and Y electrodes that form a sensor grid, said X and Y electrodes laying in a single plane orthogonal to each other.

3. A method for detecting a plurality of objects on a touchpad, said method comprising the steps of:
    1) providing a plurality of X and Y electrodes that form a sensor grid for detecting a presence of at least two objects on the touchpad, said X and Y electrodes laying in a single plane orthogonal to each other and forming a quadrilateral having four edges;
    2) detecting a presence of at least two objects on the touch sensitive surface by performing the following data collection algorithm from each of the four edges;
    3) collecting data from the plurality of electrodes beginning from an edge and moving towards an opposite edge of the quadrilateral;
    4) stopping data collection when an object is detected; and
    5) repeating steps 3 and 4 by starting data collection beginning at each of the four edges, in order to determine the boundaries of a perimeter formed by the at least two objects that forms a quadrilateral, and wherein each of the at least two objects les within the perimeter.

4. A method for detecting a plurality of objects on a touch sensitive surface, said method comprising the steps of:
    1) providing a plurality of electrodes that form a sensor grid for detecting a presence of at least two objects on the touchpad;
    2) detecting a presence of at least two objects on the touch sensitive surface by performing the following data collection algorithm from each of the four edges;
    3) beginning a data collection algorithm by collecting data from the plurality of electrodes beginning from a first edge and moving away therefrom along electrodes that are parallel to the first edge;
    4) stopping toe data collection algorithm when an object is detected; and
    5) repeating steps 3 and 4 by starting the data collection algorithm beginning at each of the four edges in order to determine the boundaries of a perimeter formed by the at least two objects that forms a quadrilateral, and wherein each of the at least two objects lies within the perimeter.

5. The method as defined in claim 1 wherein the method further comprises the step of treating the at least two objects as end-points of a single object when only two objects are detected.

6. The method as defined in claim 1 wherein the method further comprises the step of treating the at least two objects as a perimeter in the shape of a quadrilateral when the at least two objects are at least three objects.

* * * * *